US012626120B2

(12) United States Patent
Sharma

(10) Patent No.: US 12,626,120 B2
(45) Date of Patent: May 12, 2026

(54) AUTOMATED PIXEL-WISE LABELING OF ROCK CUTTINGS BASED ON CONVOLUTIONAL NEURAL NETWORK-BASED EDGE DETECTION

(71) Applicant: Schlumberger Technology Corporation, Sugar Land, TX (US)

(72) Inventor: Richa Sharma, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1060 days.

(21) Appl. No.: 17/173,605

(22) Filed: Feb. 11, 2021

(65) Prior Publication Data

US 2021/0248428 A1 Aug. 12, 2021

Related U.S. Application Data

(60) Provisional application No. 62/972,671, filed on Feb. 11, 2020.

(51) Int. Cl.

| | |
|---|---|
| *G06N 3/08* | (2023.01) |
| *G06F 18/214* | (2023.01) |
| *G06F 18/241* | (2023.01) |
| *G06V 10/44* | (2022.01) |
| *G06V 10/764* | (2022.01) |
| *G06V 10/82* | (2022.01) |

(52) U.S. Cl.
CPC ............. *G06N 3/08* (2013.01); *G06F 18/214* (2023.01); *G06F 18/241* (2023.01); *G06V 10/44* (2022.01); *G06V 10/764* (2022.01); *G06V 10/82* (2022.01)

(58) Field of Classification Search
CPC ...... G06V 10/764; G06V 10/82; G06V 10/44; G06N 3/045; G06N 3/08; G06F 18/214; G06F 18/241
See application file for complete search history.

(56) References Cited

U.S. PATENT DOCUMENTS

| | | | | |
|---|---|---|---|---|
| 5,710,830 A | * | 1/1998 | Holeva | ................ G05D 1/0816 |
| | | | | 358/464 |
| 10,781,692 B2 | * | 9/2020 | Francois | .............. G06V 10/267 |
| 2018/0103243 A1 | * | 4/2018 | Lee | ......................... G06V 10/44 |
| 2018/0336683 A1 | * | 11/2018 | Feng | ..................... G06V 10/82 |

OTHER PUBLICATIONS

Authors: Ran et al Title: Rock Classification from Field Image Patches Analyzed Using a Deep Convolutional Neural Network Publication Date: Aug. 18, 2019 (Year: 2019).*
Authors: Karimpouli & Tahmasebi Title: Segmentation of digital rock images using deep convolutional autoencoder networks Publication Date: Feb. 6, 2019 (Year: 2019).*
(Continued)

*Primary Examiner* — Luis A Sitiriche
*Assistant Examiner* — Amy Tran
(74) *Attorney, Agent, or Firm* — Jeffrey D. Frantz

(57) ABSTRACT

A method, workflow and system for automated classification of rock cuttings based on two tasks: (i) pixel-wise labeling of rock cutting images based on a convolutional neural network-based edge detection scheme; and (ii) training a general purpose deep learning model for classification of heterogeneous rock cutting mixtures based on the underlying texture.

16 Claims, 8 Drawing Sheets
(7 of 8 Drawing Sheet(s) Filed in Color)

(56) References Cited

OTHER PUBLICATIONS

Authors: Giannarou & Stathaki Title: Edge Detection Using Quantitative Combination of Multiple Operators Date: Jan. 23, 2006 (Year: 2006).*

Authors: Peng et al. Title: Using Convolutional Encoder-Decoder for Document Image Binarization Date: Jan. 29, 2018 (Year: 2018).*

Authors: Bull et al Title: Delineation of Rock Fragments by Classification of Image Patches using Compressed Random Features Date: Oct. 12, 2015 (Year: 2015).*

Author: Heather Dunlop Title: Automatic Rock Detection and Classification in Natural Scenes Date: Aug. 2006 (Year: 2006).*

Authors: Karimpouli & Tahmasebi Title: Segmentation of digital rock images using deep convolutional autoencoder networks Date: Feb. 6, 2019 (Year: 2019).*

* cited by examiner

Successful implementation of edge detection (after extensive turning)

Multiple failure points (tuning is not effective in removing these points)

Illustration of encoder decoder network

AUTOMATED PIXEL-WISE LABELING OF ROCK CUTTINGS BASED ON CONVOLUTIONAL NEURAL NETWORK-BASED EDGE DETECTION

RELATED APPLICATIONS

This application claims the benefit of and priority to U.S. Provisional Application Ser. No. 62/972,671, filed Feb. 11, 2020, which is incorporated by reference herein.

FIELD

The present disclosure relates to methods and systems that acquire images of rock cuttings and process these images for automated classification of the rock cuttings.

BACKGROUND

A number of sophisticated operators have been developed and tested for edge detection. Some well-known examples include: Sobel, Robert, and Prewitt operators. Each operator is designed to be sensitive to certain types of edges. The geometry of an operator governs the characteristic direction in which it is most sensitive to edges. For example, an operator can be optimized to look for horizontal, vertical, or diagonal edges. The final selection of these operators is made based on a variety of factors such as background/ foreground noise, edge structure and orientation.

Despite recent progress in the design, tuning, and selection of edge detection operators, significant practical challenges remain for their implementation in image classification/labeling tasks involving noisy, heterogeneous, and large-scale data. A particularly challenging application is their use in the labeling of noisy images of rock cuttings with heterogeneous cutting size distribution, texture, spacing/ overlap, and background quality (shadow, brightness etc.). Furthermore, in this application a large number of images, each with multiple types of rock cuttings and lighting conditions, need to be processed at a rapid rate with relatively little human effort. Thus, the methodology and systems of the present disclosure are designed to provide automated labeling of rock cuttings in a manner that is robust and scalable.

SUMMARY

The present disclosure describes a method, workflow and system for automated classification of rock cuttings based on two tasks: (i) pixel-wise labeling of rock cutting images based on a convolutional neural network-based edge detection scheme; and (ii) training a general purpose deep learning model for classification of heterogeneous rock cutting mixtures based on the underlying texture. The scalability of the proposed method, workflow and system relies on automated implementation of each sub-task and their effective integration. The first task automatically generates high quality labels of rock cuttings in a highly robust, accurate, and scalable manner. The resulting pixel-wise labels are used in a second task to train a deep learning model for the classification of rock cutting images. The effectiveness of this integrated methodology and systems results from the fact that the generalization ability of deep learning models depends on the high-quality training dataset.

The present disclosure describes new methods, workflows and systems that employ a substrate that supports rock cuttings during image acquisition and facilitates the processing of such images for automated classification of the rock cuttings. In embodiments, the substrate can include patterns (or a pattern of features) engraved or otherwise formed in a planar surface of material. Details of the substrate as well as workflows and systems that capture images of rock cuttings supported on the substrate are described in co-owned U.S. Provisional Patent Appl. No. 62/948,504, herein incorporated by reference in its entirety. The image-based classification or pixel wise labeling of rock cuttings can involve edge detection, which is a classical and well-studied problem in image processing. It is the process of identifying reasonably sharp discontinuities in an image. An "edge" can be defined as a discontinuity in the depth, surface, color, illumination or a combination of all these factors. Edge detection methods typically aim to achieve the following objectives:

(i) maximize the probability of successfully detected edges within an image;

(ii) minimize the gap between real and detected edge (accurate localization); and (iii) single detection for real edge and its shadow (unique identification).

Common edge detection algorithms rely on a number of steps such as smoothing, gradient finding, non-maximum suppression, and double thresholding.

In developing the methodology and systems of the present disclosure, various edge detection operators were tuned, optimized, and combined. But the results highlighted that classical edge detection methods can be extremely fragile and non-scalable. Particularly, it was found that the detected edges tend to have high-frequency noise, and further efforts to reduce this noise results in blurred and distorted edges. One possible solution to this problem could be to use operators that average enough data to discount [localized] noisy pixels. Still, in optimizing edge detection operators, one faces the fundamental tradeoff between localization accuracy and noise reduction in detected edges.

The present disclosure describes a method, workflow and system for automated classification of rock cuttings based on two tasks: (i) pixel-wise labeling of rock cutting images based on a convolutional neural network-based edge detection scheme; and (ii) training a general purpose deep learning model for classification of heterogeneous rock cutting mixtures based on the underlying texture. The scalability of the proposed method, workflow and system relies on automated implementation of each sub-task and their effective integration. The first task automatically generates high quality labels of rock cuttings in a highly robust, accurate, and scalable manner. The resulting pixel-wise labels are used in a second task to train a deep learning model for the classification of rock cutting images. The effectiveness of this integrated methodology and systems results from the fact that the generalization ability of deep learning models depends on the high-quality training dataset.

The present disclosure describes new methods, workflows and systems that employ a substrate that supports rock cuttings during image acquisition and facilitates the processing of such images for automated classification of the rock cuttings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1B:
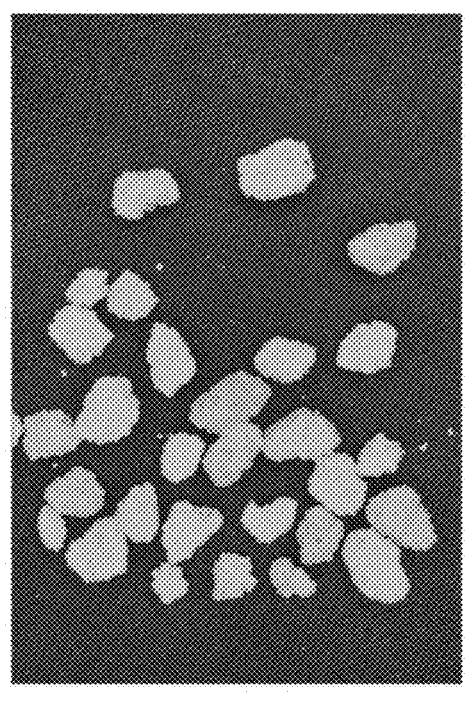
FIG. 1B depicts a successful implementation of edge detection (after extensive turning).
Figure 1A:
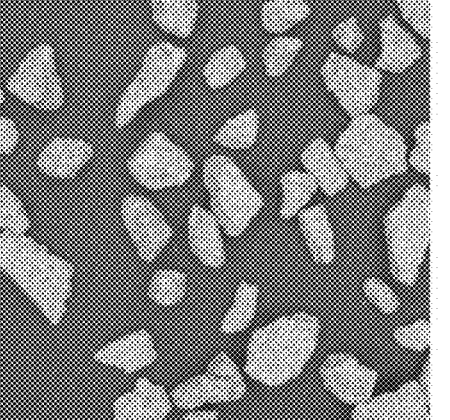
FIG. 1A depicts a successful implementation of edge detection (after extensive turning.
Figure 2B:
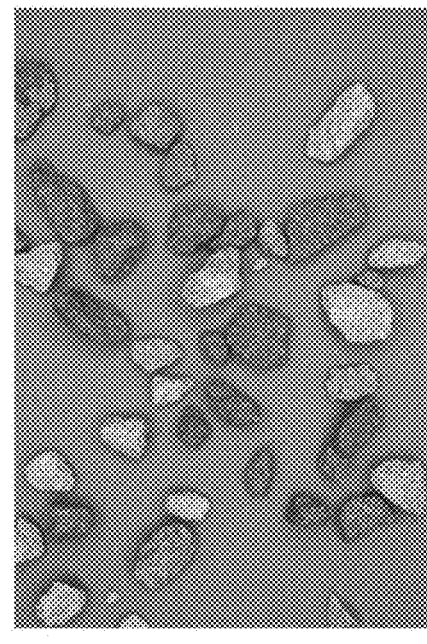
FIG. 2B depicts multiple failure points (tuning is not effective in removing these points)
Figure 2A:
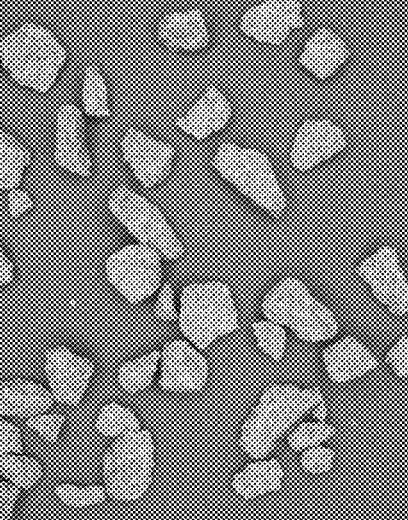
FIG. 2A depicts multiple failure points (tuning is not effective in removing these points)

FIGS. 1A and 1B demonstrate a successful example after extensive tuning; on the other hand, it is quite likely that edge detection fails on multiple counts as seen in FIGS. 2A and 2B.

In summary, the key challenges faced by traditional edge detection methods are:

Image-level tuning of individual operations (smoothing, filtering, thresholding);

Removing the negative impacts of shadows;

ddressing the heterogeneities due to color and texture of cuttings;

Interplay of substrate (color, brightness, etc.) and cuttings, and aberrations due to dirt.

A litmus test for a supervised learning algorithm is its ability to accurately classify data generated from an autonomous system such as a high-frequency imaging platform. The challenge is to create, update, and maintain a high-quality and sufficiently diverse set of labeled training data. In most cases, all these tasks require a significant human involvement and intermittent re-training or re-tuning of machine learning algorithms. With additional labeled data coming in, the consistency of predictions on the previously obtained data becomes problematic.

In recent years, a few solutions have been developed that address these issues. For example, the Ground Truth Labeler app makes the labeling task easy and efficient. This app includes features to annotate common objects as rectangles, lines, or pixel labels. Pixel-based labeling is noteworthy because of its generic nature—here each pixel in an image is assigned a class or category, which can then be used to train a pixel-level segmentation algorithm (e.g., a deepnet). In principle, the app can be used to manually generate labeled data set; however, it is quite clear that for most practical applications the time and resources required to complete this process would be significant.

Although deep-learning based pixel-wise annotations are arguably best at predicting semantic classes for several benchmark datasets, we believe that the time and effort required in supervised training is a major bottleneck to this technology. In some extreme cases, one may need to manually assign each pixel of an image using a photoshop-like tool.

To address the abovementioned challenges of fragile edge detection methods and non-scalable (costly) pixel-based labeling methods, the present disclosure provides a new workflow and corresponding system that achieves automated and robust labeling of rock cutting images in large-scale data sets, without requiring tuning of edge detection operators and detailed manual labeling tasks. This technology is key to rapidly generating a rich and diverse training data that is well-suited for standard pixel-level segmentation algorithms.

Figure 3:
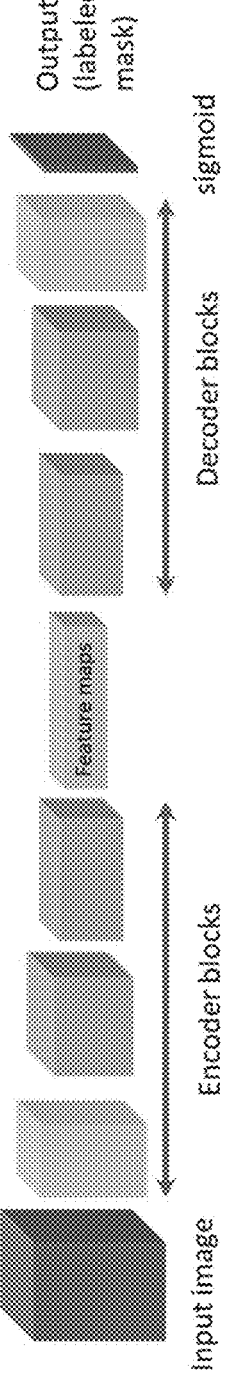
FIG. 3 depicts an example encoder decoder network.

Below we highlight the main steps in a workflow to train a machine learning model (particularly, a convolutional encoder-decoder neural network) to detect cutting boundaries and assign binary labels to all the pixels inside these boundaries. The basic trainable encoder-decoder network is topologically like a multi-layer convolutional neural network. The encoder module aggregates features at multiple levels along with the down-sampling of data to obtain coarse features abstractions, and the decoder module up-samples these features to recover fine spatial classification. In general, the encoder takes an input image and generates a high-dimensional feature vector. On the other hand, the role of the decoder is to map this high-dimensional (but low resolution) feature vector to feature maps with the resolution of original input, and thus achieve pixel-wise labeling. The building blocks of the encoder module includes convolution filters, element-wise non-linearity, max-pooling or strided convolution based down sampling—the sequence of these steps builds a representation of the latent features. The decoder module includes upsampling and transpose convolution with "skip connections" of filters from the corresponding block of the encoder module. An example convolutional encoder-decoder neural network is shown in FIG. 3.

Workflow

Step 1: Supervised Data Selection

Figure 4:
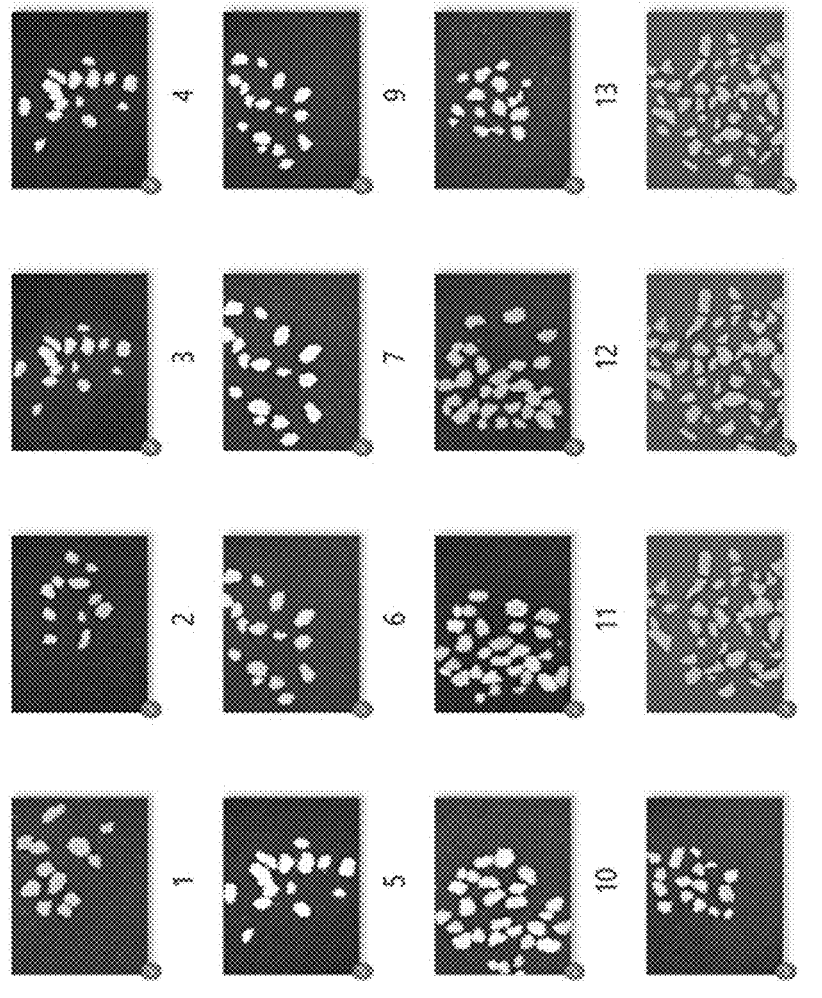
FIG. 4 depicts a first operation of a method.

In this step 1, images of rock cuttings of the same lithology (texture ID) and color are selected. Furthermore, an image background is chosen to ensure good color contrast. Importantly, this step can be configured such that the rock cuttings of selected images are not in contact with each other and the shadow effects are not present. Operations of step 1 are illustrated in FIG. 4.

Step 2: Edge Detection, Contouring, and Sorting

Figure 5:
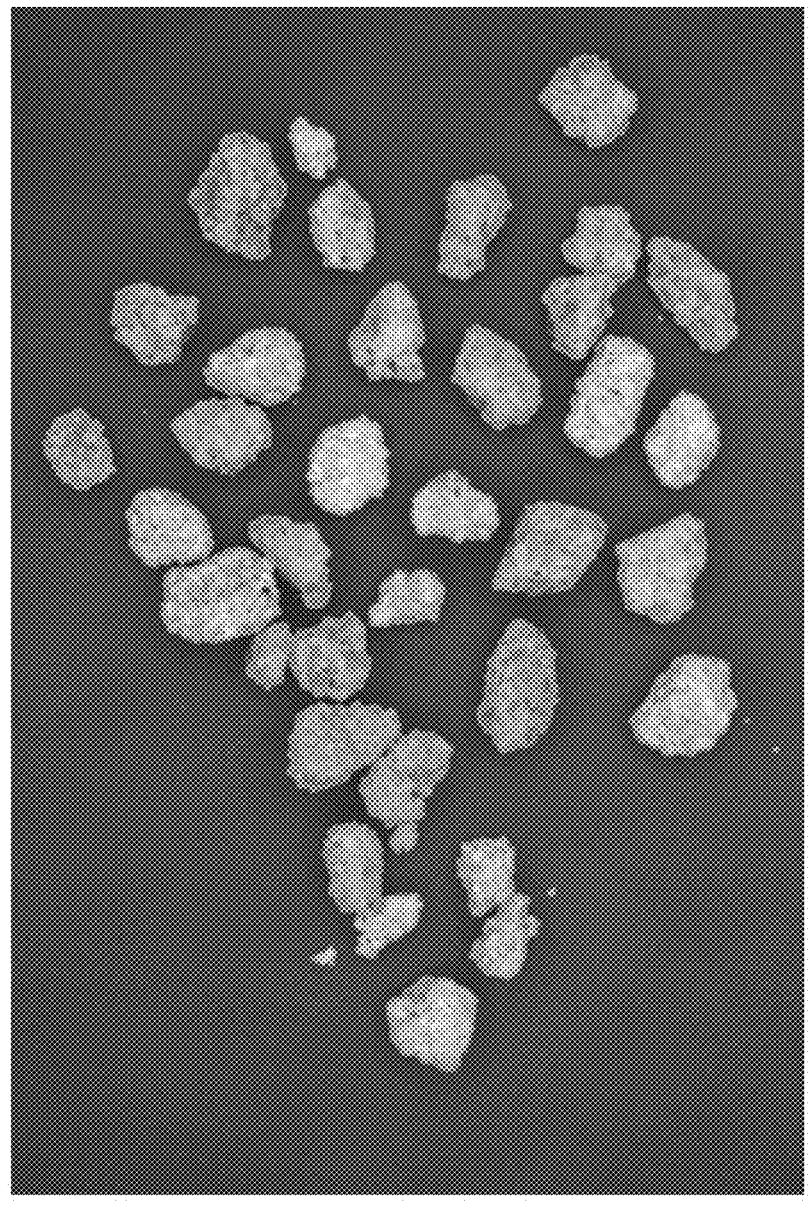
FIG. 5 depicts an Edge detection and contouring operation of a second operation of the method.

In this step 2, we use multi-stage algorithm based on the edge detection operators described above for supervised edge detection on the selected images of rock cuttings. Next, contour processing can be performed on the selected images of rock cuttings to localize the pixels inside the edge boundaries and thus determine the pixels of the perimeter or edge boundary of each rock cutting. A sorting algorithm can then be applied to the selected images of rock cuttings to arrange the enclosed rock cuttings according to their perimeters or edge boundaries. A simple thresholding can be applied to the selected images of rock cuttings to eliminate the effects of dirt and other fine particulate matter. Edge detection and contouring operations of step 2 are illustrated in FIG. 5, with the edge boundaries of the rock cuttings depicted in green.

Step 3: Binary Labeling

In this step 3, the resultant data of the Edge detection, contouring, and sorting of step 1 is used to assign binary labels (e.g., "1" or "0") to all pixels within the selected images of rock cuttings. Specifically, all pixels within the cutting boundary are assigned label "1" and the rest of the pixels (background) are assigned label "0".

Importantly, Steps 1-3 are computationally efficient and only require a nominal human effort. The figures below illustrate the Steps 1-2.

Step 4: Synthetic Data Generation

Step 4 involves intentionally distorting the quality of the selected images of rock cutting by modifying the color and injecting a gaussian blur, while keeping the binary labels

Figure 6:
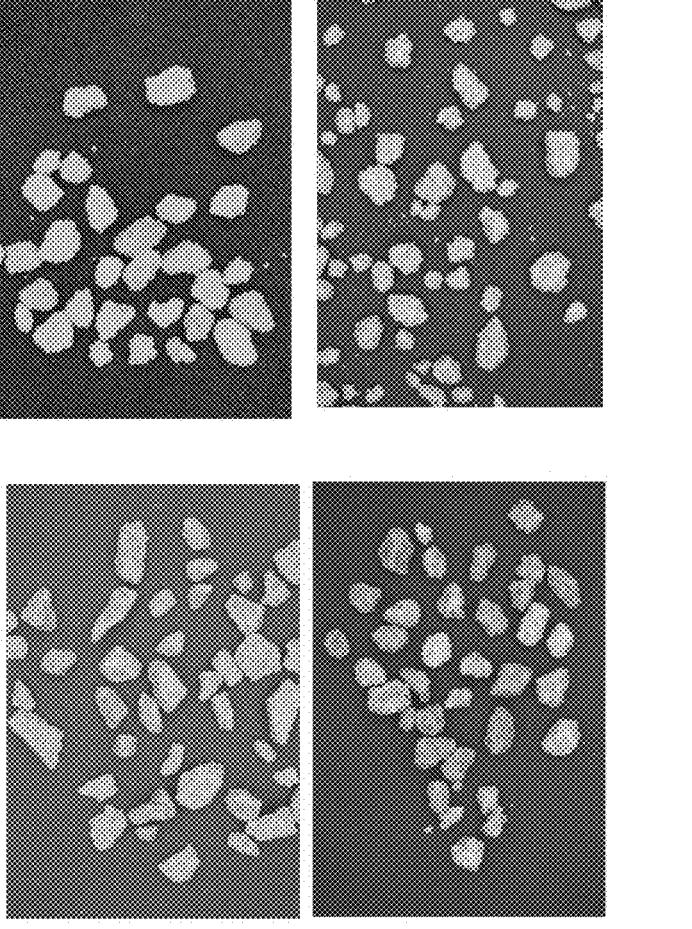
FIG. 6 depicts another operation of the method.
Figure 7:
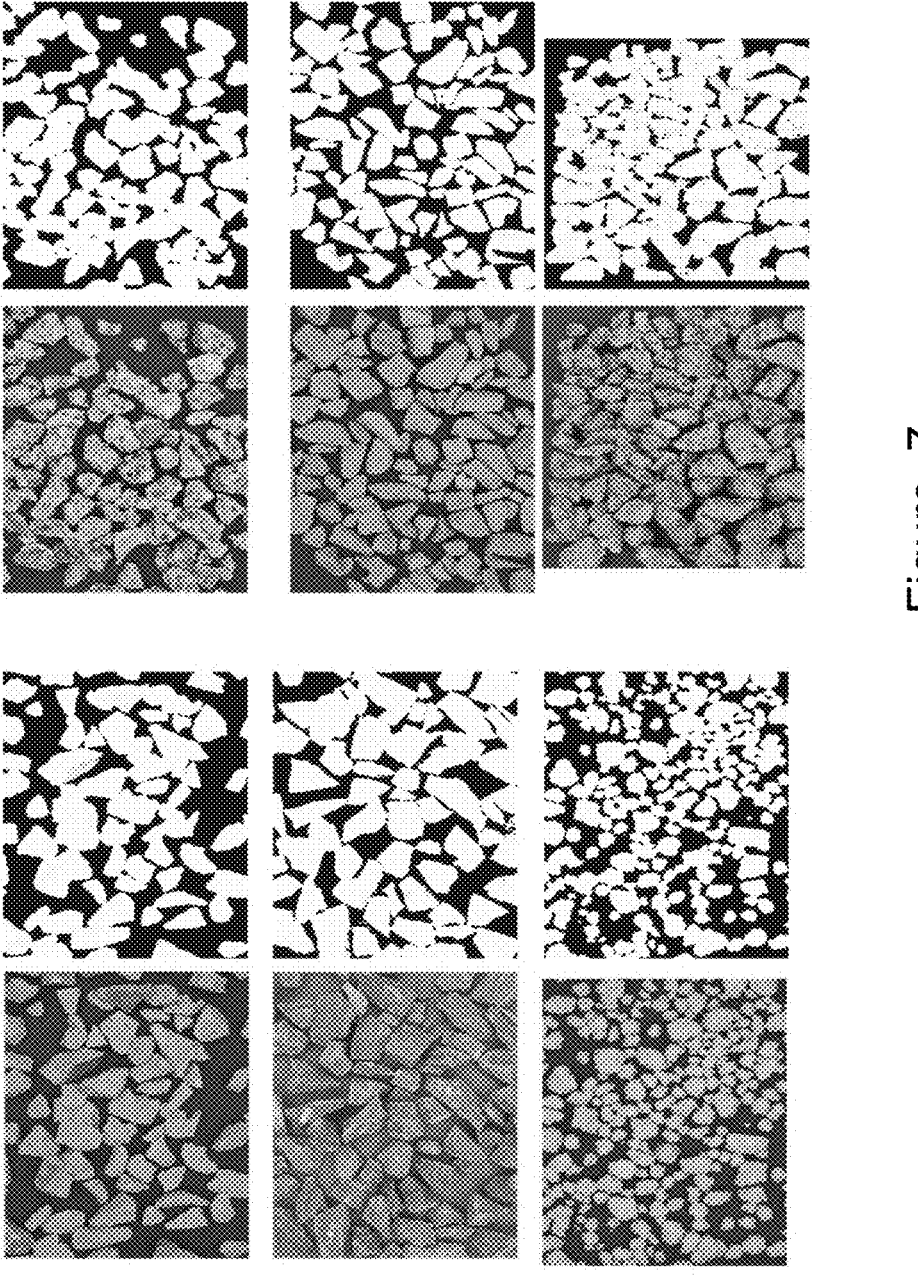
FIG. 7 illustrates the success of binary labeling achieved by the trained convolutional encoder-decoder network.

5 unchanged. The idea is to capture the noisy characteristics of real-world images. A number of synthetic data sets can be generated to capture the environmental characteristics of images. Operations of step 4 are illustrated in FIG. 6.
Step 5: Model Training:

In step 5, the multiple sets of synthetic data are combined and used to train the convolutional encoder-decoder neural network. Such training adjusts or tunes the parameters of the layers of the encoder and decoder parts of the convolutional encoder-decoder neural network. In the convolutional encoder-decoder neural network, the height and width of the image is gradually reduced (down-sampling due to pooling layer); this helps the filters in deeper layers to focus on a larger receptive field (thus capturing the context and semantic features). More complex features can be extracted by suitably selecting the number of channels and depth (number of filters used). After the feature extraction is done by the convolutional layers and polling layers of the encoder part, original image size is restored using the decoder part so that each pixel in the image is assigned a label. FIG. 7 illustrates the success of binary labeling achieved by the trained convolutional encoder-decoder network. In this example, the trained convolutional encoder-decoder network identifies each cutting and labels all its pixels with its id/class/category. In these images, all cutting labels are replaced with (255, 255, 255) to illustrate the detection and localization accuracy for each cutting.

A particularly attractive feature of our labeling approach is that trained convolutional encoder-decoder neural network has high accuracy for all typical variations in (i) background colors, (ii) cutting coverages (pile/heap, contact, or no contact), (iii) colors of cuttings, (iv) all cutting shapes (sharp to round edges). Furthermore, the trained convolutional encoder-decoder neural network correctly identifies dirt and fine matter as part of background and identifies cutting shadows and labels them as background.

Importantly, trained convolutional encoder-decoder neural networks can be separately generated for each texture ID/class/category. Once trained, these networks can be used to quickly and efficiently generate labels for tens of thousands of images. This enables us to generate a diverse (rich) and accurate labeled data set which can be used by a pixel-level segmentation or classification algorithm. This overall automated labeling approach is highly efficient, requires very minimal human effort, and is robust to variations in image quality and cutting composition.

Figure 8:
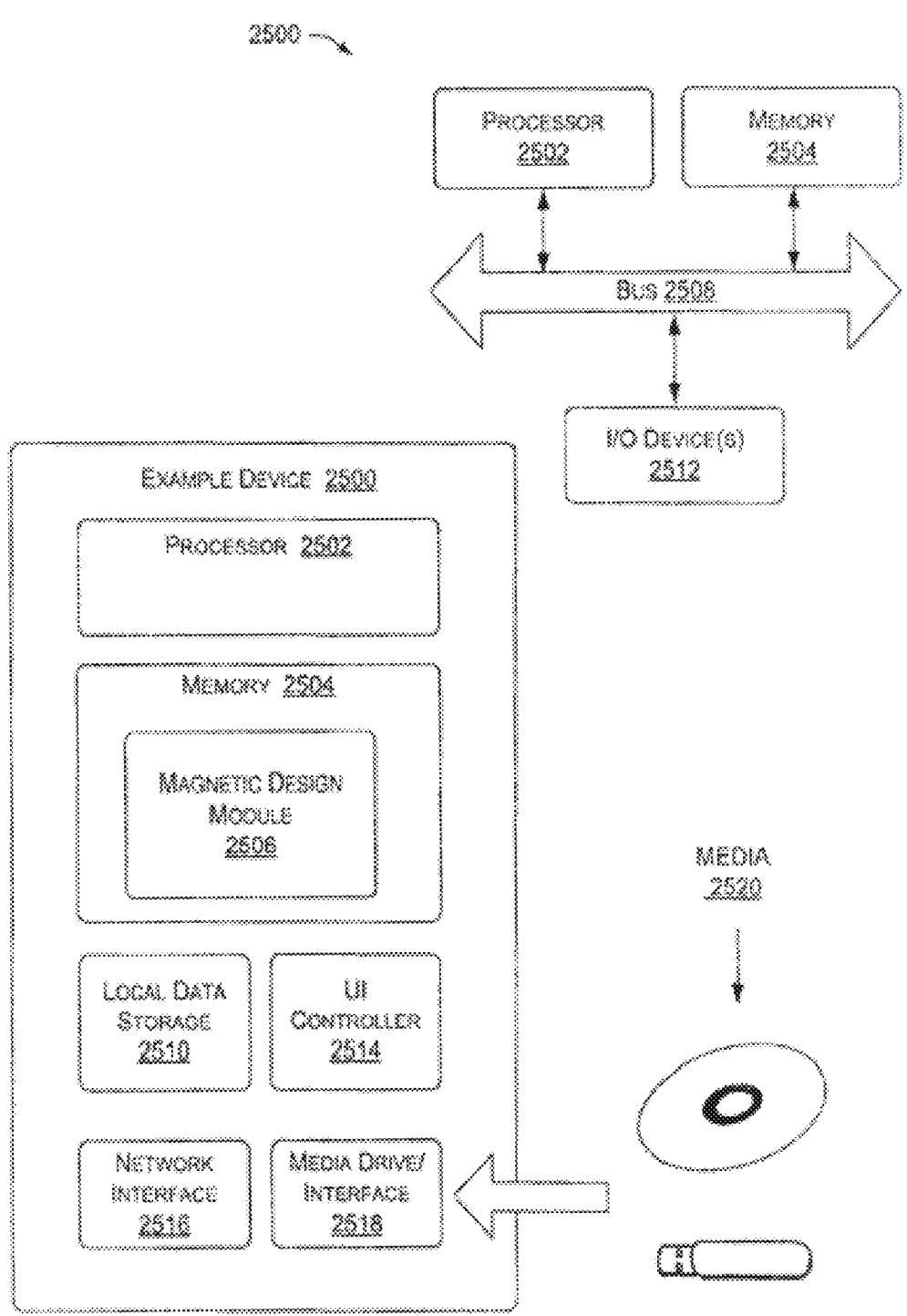
FIG. 8 illustrates an example device configured to implement various embodiments of the methods.

FIG. 8 illustrates an example device 2500, with a processor 2502 and memory 2504 that can be configured to implement various embodiments of the methods and systems for automated image-based classification of rock cuttings (such as texture-based deep learning classification of rock cutting) as discussed in this disclosure. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein several embodiments of methods and systems for producing an image of one or more rock cuttings. While particular embodiments have been described, it is not intended that the invention be limited thereto, as it is intended that the invention be as broad in scope as the art will allow and that the specification be read likewise. It will therefore be appreciated by those skilled in the art that other modifications could be made to the provided invention without deviating from its spirit and scope as claimed.

What is claimed is:

1. A computer-implemented method of classifying rock cuttings, comprising:

obtaining a plurality of images depicting depicted rock cuttings distributed on a background substrate;

applying one or more edge detection operators to the plurality of images to identify rock cutting boundaries within the plurality of images associated with detected edges of the depicted rock cuttings;

generating binary labels for all pixels of the plurality of images based on the rock cutting boundaries, wherein generating the binary labels includes, for each image of the plurality of images:

assigning a first binary label to all pixels within the rock cutting boundaries of each image of the plurality of images; and assigning a second binary label to all pixels of the background substrate of each image of the plurality of images, such that all pixels of each image of the plurality of images are assigned to only the first binary label or the second binary label;

generating, without tuning the one or more edge detection operators, a plurality of training images based on modifying a color of the plurality of images and injecting a gaussian blur to the plurality of images while keeping the binary labels unchanged;

causing a cutting detection machine learning model to be trained based on the plurality of training images and the first binary label assigned to all pixels and the second binary label assigned to all pixels, wherein the cutting detection machine learning model is trained to predict output binary labels for each pixel of a given image, the output binary labels indicating portions of the given image that include rock cuttings, wherein the cutting detection machine learning model includes a convolutional encoder-decoder neural network;

obtaining an input image of one or more rock cuttings; and supplying the input image of the one or more rock cuttings as an input to the trained cutting detection machine learning model to automatically detect detected portions of the input image corresponding to the one or more rock cuttings in the input image and automatically generate the first binary labels indicating the portions of the input image corresponding to each of the one or more rock cuttings.

2. The method of claim 1, wherein obtaining the plurality of images includes selecting the plurality of images based on the depicted rock cuttings in the plurality of images not being in contact with each other and based on the plurality of images not having shadow effects.

3. The method of claim 1, further comprising providing the input image and the first binary labels of the detected portions of the input image to a pixel-level classification model to classify the one or more rock cuttings based on the detected portions of the input image indicated by the first binary labels.

4. The method of claim 1, wherein the cutting detection machine learning model is trained to automatically detect detected additional portions of the input image corresponding to dirt and fine matter in the input image and automatically assign the second binary label to all pixels of the detected additional portions corresponding to the background substrate of the input image.

5. The method of claim 1, wherein the plurality of images depicts downhole rock cuttings produced from a downhole operation in a downhole environment.

6. The method of claim 1, wherein the plurality of images depicts rock cuttings having a same lithology and color.

7. The method of claim 1, wherein the plurality of images depicts rock cuttings on a background of a contrasting color to a color of the rock cuttings.

8. A system comprising:

at least one processor;

memory in electronic communication with the at least one processor; and instructions stored in the memory, the instructions being executable by the at least one processor to:

obtain a plurality of images depicting depicted rock cuttings distributed on a background substrate;

apply one or more edge detection operators to the plurality of images to identify rock cutting boundaries within the plurality of images associated with detected edges of the depicted rock cuttings;

generate binary labels for all pixels of the plurality of images based on the rock cutting boundaries, wherein generating the binary labels includes, for each image of the plurality of images:

assign a first binary label to all pixels within the rock cutting boundaries of each image of the plurality of images; and assign a second binary label to all pixels of the background substrate of each image of the plurality of images, such that all pixels of each image of the plurality of images are assigned to only the first binary label or the second binary label;

generate, without tuning the one or more edge detection operators, a plurality of training images based on modifying a color of the plurality of images and injecting a gaussian blur to the plurality of images while keeping the binary labels unchanged;

cause a cutting detection machine learning model to be trained based on the plurality of training images and the first binary label assigned to all pixels and the second binary label assigned to all pixels, wherein the cutting detection machine learning model is trained to predict output binary labels for each pixel of a given image, the output binary labels indicating portions of the given image that include rock cuttings, wherein the cutting detection machine learning model includes a convolutional encoder-decoder neural network;

obtain an input image of one or more rock cuttings; and supply the input image of the one or more rock cuttings as an input to the trained cutting detection machine learning model to automatically detect detected portions of the input image corresponding to the one or more rock cuttings in the input image and automatically generate the first binary labels indicating the portions of the input image corresponding to each of the one or more rock cuttings.

9. The system of claim 8, wherein to obtain the plurality of images, the instructions are executable by the at least one processor to select the plurality of images based on the depicted rock cuttings in the plurality of images not being in contact with each other and based on the plurality of images not having shadow effects.

10. The system of claim 8, wherein the instructions are further executable by the at least one processor to provide the input image and the first binary labels of the detected portions of the input image to a pixel-level classification model to classify the one or more rock cuttings based on the detected portions of the input image indicated by the first binary labels.

11. The system of claim 8, wherein the cutting detection machine learning model is trained to automatically detect detected additional portions of the input image corresponding to dirt and fine matter in the input image and automatically assign the second binary label to all pixels of the detected additional portions corresponding to the background substrate of the input image.

12. The system of claim 8, wherein the plurality of images depicts downhole rock cuttings produced from a downhole operation in a downhole environment.

13. The system of claim 8, wherein the plurality of images depicts rock cuttings having a same lithology and color.

14. The system of claim 8, wherein the plurality of images depicts rock cuttings on a background of a contrasting color to a color of the rock cuttings.

15. A computer-readable storage medium including instructions that, when executed by at least one processor, cause the at least one processor to:

obtain a plurality of images depicting depicted rock cuttings distributed on a background substrate;

apply one or more edge detection operators to the plurality of images to identify rock cutting boundaries within the plurality of images associated with detected edges of the depicted rock cuttings;

generate binary labels for all pixels of the plurality of images based on the rock cutting boundaries, wherein generating the binary labels includes, for each image of the plurality of images:

assign a first binary label to all pixels within the rock cutting boundaries of each image of the plurality of images; and assign a second binary label to all pixels of the background substrate of each image of the plurality of images, such that all pixels of each image of the plurality of images are assigned to only the first binary label or the second binary label;

generate, without tuning the one or more edge detection operators, a plurality of training images based on modifying a color of the plurality of images and injecting a gaussian blur to the plurality of images while keeping the binary labels unchanged;

cause a cutting detection machine learning model to be trained based on the plurality of training images and the first binary label assigned to all pixels and the second binary label assigned to all pixels, wherein the cutting detection machine learning model is trained to predict output binary labels for each pixel of a given image, the output binary labels indicating portions of the given image that include rock cuttings, wherein the cutting detection machine learning model includes a convolutional encoder-decoder neural network;

obtain an input image of one or more rock cuttings; and supply the input image of the one or more rock cuttings as an input to the trained cutting detection machine learning model to automatically detect detected portions of the input image corresponding to the one or more rock cuttings in the input image and automatically generate the first binary labels indicating the portions of the input image corresponding to each of the one or more rock cuttings.

16. The computer-readable storage medium of claim 15, wherein the input image includes one or more image noise artifacts such that the one or more edge detection operators, applied to the input image, cannot detect one or more edges of the one or more rock cuttings in the input image, wherein the one or more image noise artifacts include image noise artifacts of one or more types including at least one of variations in rock cutting size distribution, variations in rock cutting texture, variations in rock cutting color, variations in rock cutting shape, variations in rock cutting spacing, or variations in rock cutting overlap, and wherein the plurality of images do not include image noise artifacts of the one or more types included in the input image.

\* \* \* \* \*